US012706956B2

(12) United States Patent
Murthy et al.

(10) Patent No.: US 12,706,956 B2
(45) **Date of Patent: *Aug. 11, 2026**

(54) SECURITY POLICY ENFORCEMENT FOR RESOURCES IN BRIDGE MODE

(71) Applicant: Cisco Technology, Inc., San Jose, CA (US)

(72) Inventors: Shree Narasimha Murthy, San Jose, CA (US); Sanjay Kumar Hooda, Pleasanton, CA (US); Prakash C. Jain, Fremont, CA (US); Roberto Mitsuo Kobo, Pleasanton, CA (US); Rajagopal Venkatraman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/791,151

(22) Filed: Jul. 31, 2024

(65) Prior Publication Data

US 2024/0396945 A1 Nov. 28, 2024

Related U.S. Application Data

(63) Continuation of application No. 17/508,731, filed on Oct. 22, 2021, now Pat. No. 12,069,098.

(51) Int. Cl.

| | |
|---|---|
| ***G06F 15/16*** | (2006.01) |
| ***G06F 9/455*** | (2018.01) |
| ***H04L 9/40*** | (2022.01) |
| ***H04L 61/5007*** | (2022.01) |
| ***H04L 61/5014*** | (2022.01) |

(52) U.S. Cl.

CPC .......... *H04L 63/20* (2013.01); *G06F 9/45558* (2013.01); *H04L 61/5007* (2022.05); *H04L 61/5014* (2022.05)

(58) Field of Classification Search

CPC ............ H04L 61/5007; H04L 61/5014; H04L 61/103; H04L 63/0236; H04L 63/20; G06F 2009/45587; G06F 2009/45595

USPC .............................. 709/245–246; 726/26–27

See application file for complete search history.

(56) References Cited

U.S. PATENT DOCUMENTS 8,250,189 B1 8/2012 Breau
8,955,038 B2 * 2/2015 Nicodemus ............ G06F 21/55 726/28
9,053,337 B2 * 6/2015 Carrara .............. G06F 21/6218

(Continued)

*Primary Examiner* — Bharat Barot
(74) *Attorney, Agent, or Firm* — Lee & Hayes, P.C.

(57) ABSTRACT

Techniques for analyzing traffic originating from a host device in a wireless network to identify one or more virtual machines (VMs) running on the host device and connected to the network via the host device in bridge mode. When a VM is created in bridge mode behind a host device, the traffic originated by the VM will have the source Media Access Layer (MAC) address of the host device. According to techniques described herein, devices and/or components associated with the network may profile the traffic to identify an address of the VM, such as by analyzing dynamic host configuration protocol (DHCP) packets to determine the Internet Protocol (IP) address of the VM. Once the IP address and the MAC address of the VM is known, the components and/or devices may apply security policies to the VM that may be different than security policies applied to the host device.

20 Claims, 7 Drawing Sheets

(56) References Cited

U.S. PATENT DOCUMENTS

| | | | |
|---|---|---|---|
| 9,531,758 | B2 * | 12/2016 | Devarajan ............... H04L 63/20 |
| 10,965,737 | B1 | 3/2021 | Parulkar |
| 11,017,107 | B2 * | 5/2021 | Rungta ............... G06F 9/45533 |
| 11,349,806 | B2 | 5/2022 | Atanasov |
| 12,069,098 | B2 * | 8/2024 | Murthy ............... H04L 61/5007 |
| 2012/0216273 | A1 | 8/2012 | Rolette et al. |
| 2014/0244733 | A1 | 8/2014 | Han et al. |
| 2014/0301387 | A1 | 10/2014 | Subramanian et al. |
| 2015/0163196 | A1 | 6/2015 | Bhagwat et al. |
| 2016/0094488 | A1 | 3/2016 | Chen |
| 2017/0026417 | A1 | 1/2017 | Ermagan et al. |
| 2018/0006996 | A1 | 1/2018 | Nantel |
| 2018/0063160 | A1 | 3/2018 | Kumar |
| 2023/0131771 | A1 | 4/2023 | Murthy et al. |

* cited by examiner

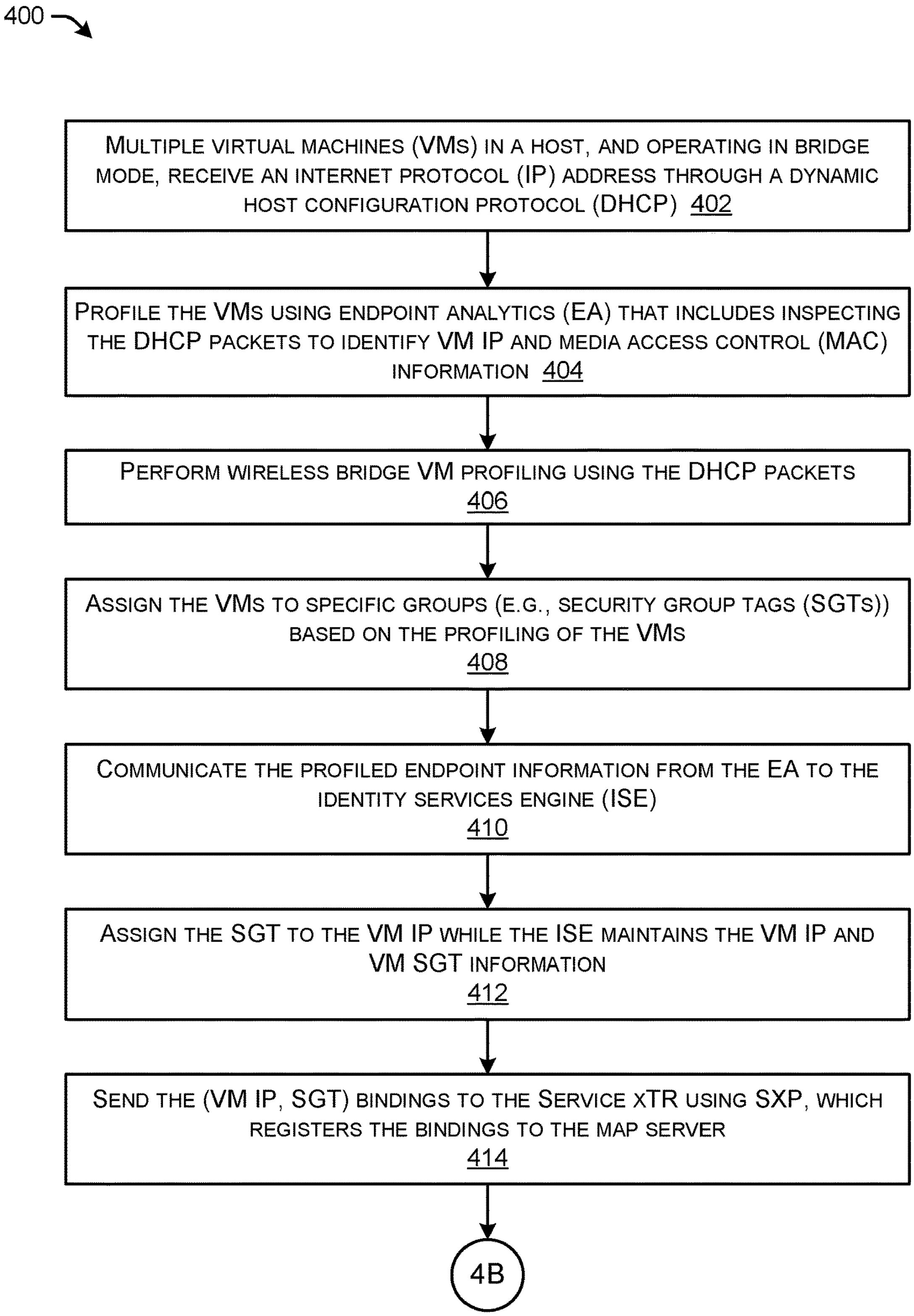

FIG. 4A

MULTIPLE VIRTUAL MACHINES (VMS) IN A HOST, AND OPERATING IN BRIDGE MODE, RECEIVE AN INTERNET PROTOCOL (IP) ADDRESS THROUGH A DYNAMIC HOST CONFIGURATION PROTOCOL (DHCP) 402

PROFILE THE VMS USING ENDPOINT ANALYTICS (EA) THAT INCLUDES INSPECTING THE DHCP PACKETS TO IDENTIFY VM IP AND MEDIA ACCESS CONTROL (MAC) INFORMATION 404

PERFORM WIRELESS BRIDGE VM PROFILING USING THE DHCP PACKETS 406

ASSIGN THE VMS TO SPECIFIC GROUPS (E.G., SECURITY GROUP TAGS (SGTS)) BASED ON THE PROFILING OF THE VMS 408

COMMUNICATE THE PROFILED ENDPOINT INFORMATION FROM THE EA TO THE IDENTITY SERVICES ENGINE (ISE) 410

ASSIGN THE SGT TO THE VM IP WHILE THE ISE MAINTAINS THE VM IP AND VM SGT INFORMATION 412

SEND THE (VM IP, SGT) BINDINGS TO THE SERVICE XTR USING SXP, WHICH REGISTERS THE BINDINGS TO THE MAP SERVER 414

4B

SECURITY POLICY ENFORCEMENT FOR RESOURCES IN BRIDGE MODE

RELATED APPLICATIONS

This patent application is a continuation of and claims priority to U.S. patent application Ser. No. 17/508,731, filed Oct. 22, 2021, which is fully incorporated herein by reference.

TECHNICAL FIELD

The present disclosure relates generally to the enforcement of security policies for entities located behind a wireless endpoint.

BACKGROUND

In some network environments, a wireless client may host one or more virtual machines (VMs) in bridged mode. Bridged mode typically refers to a configuration in which the VMs communicate with external systems or services directly (e.g., using the wireless client's network interface). Thus, the VMs may appear to have separate IP addresses. In this type of situation, many wireless adapters do not support promiscuous mode. Therefore, the wireless client may perform media access control (MAC) hiding.

If the wireless client performs MAC hiding, the traffic generated by the wireless client (and the traffic generated by the VMs hosted by the wireless client) use the same wireless adapter MAC address as the source MAC address for all traffic originated by the wireless client and VMs hosted by the wireless client. In this situation, the wireless infrastructure is only aware of the wireless client. All authentication and authorization policies are applied to the wireless adapter MAC address. Thus, devices using the wireless infrastructure will not see the MAC address associated with individual VMs in, for example, 802.11 packets that are being sent via the wireless adapter.

Problems may occur with the above environment when specific policies, such as security policies, need to be enforced in individual VMs. For example, the environment described above may not support the enforcement of policies on individual VMs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 4A and 4B collectively illustrate a flow diagram of an example method for enforcing policies in the network shown in FIG. 1.

DESCRIPTION OF EXAMPLE EMBODIMENTS

Overview

Figure 1:
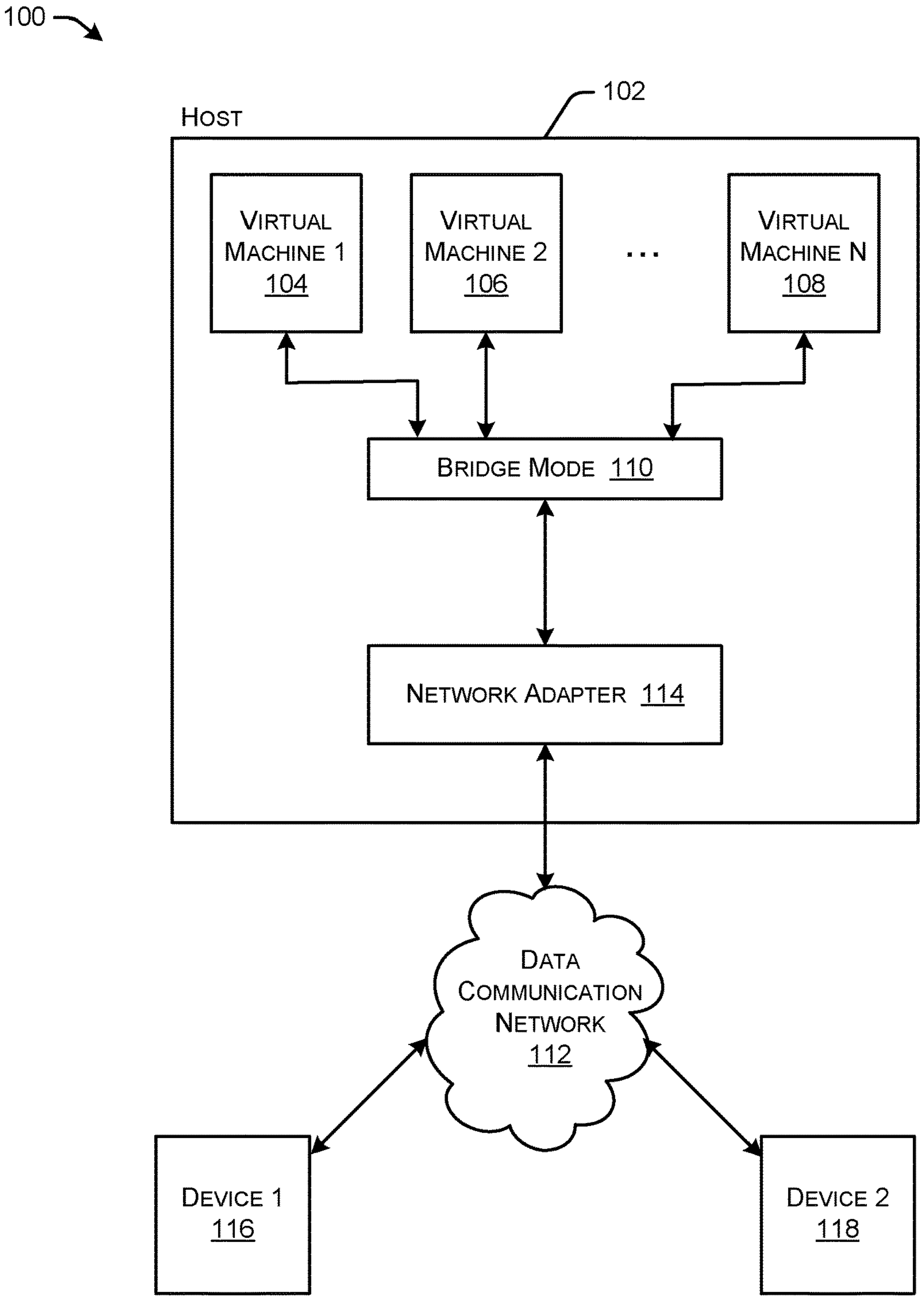
FIG. 1 illustrates a system-architecture diagram of an example network containing multiple devices, a host, and a wireless adapter.

This disclosure describes techniques for enforcing security policies for entities located, for example, behind a wireless endpoint. In some embodiments, one or more methods may be implemented at least partially by a system of devices and or components associated with a network fabric. In some instances, a first method may include analyzing one or more first packets communicated with a host device associated with a network fabric, and identifying, from the one or more first packets, a first internet protocol (IP) address associated with the host device. Further, the first method may include assigning the first IP address to a first security group associated with a first security policy. The first method may further include analyzing one or more second packets sent from the host device, identifying, from the one or more second packets, a second IP address associated with a virtual machine (VM) executing on the host, and assigning the second IP address to a second security group associated with a second security policy. Finally, the first method may include applying, by an edge device associated with the network fabric, the first security policy on first traffic associated with the host device, and applying, by the edge device, the second security policy on second traffic associated with the VM.

In some instances, a second method may include identifying a first internet protocol (IP) address and a first media access control (MAC) address of a host device, and profiling a first virtual machine (VM) executing on the host device to generate profile data. Additionally, the second method may include identifying a first security policy associated with the first VM based on the profile data, and communicating the profile data to an edge device. Finally, the second method may include applying, by the edge device, the first security policy associated with the first VM.

The systems and methods described herein allow a virtual host and a VM within the virtual host to have separate security policies. Thus, a system administrator may configure the VM to have a first security policy and configure the virtual host to have a second security policy. Additionally, the described systems and methods may allow multiple VMs within the virtual host to have separate security policies, each of which may be different from the virtual host's security policy.

Additionally, the techniques described herein may be performed by a system and/or device having non-transitory computer-readable media storing computer-executable instructions that, when executed by one or more processors, performs the method described above.

Example Embodiments

As mentioned above, problems can occur when attempting to enforce security policies for entities located behind a wireless endpoint (or any host device). For example, in some deployments, security policies need to be enforced on each of the individual VMs, and those security policies may different from policies that are applied to the host device. In these situations, the systems and methods are not able to use a Remote Authentication Dial-In User Service (Radius) change of authorization policies because there is no session present in the radius server for each of the individual VMs. A radius server may be a distributed client/server system that secures networks against unauthorized access.

As an example, host devices are able to host VMs in a bridged mode where the VM is connected to a network using the host device's network adapter (e.g., Ethernet adapter). With bridged networking, the virtual network adapter in a VM connects to a physical network adapter in the host device or system. The host network adapter enables the virtual machine to connect to the LAN that the host system uses. Bridged networking works with both wired and wireless host network adapters. Bridged networking configures the VM as a unique identity on the network, separate from and unrelated to the host system. The VM is a full participant in the network and it has access to other machines on the network, and other machines on the network can contact it as if it were a physical computer on the network.

However, when a host device has VMs hosted that are in bridged mode, and due to the fact that most network adapters do not suppose promiscuous mode, the host device will do MAC hiding. By doing MAC hiding, all of the traffic generated by the host device and the traffic generated by the VMs use the same wireless adapter MAC address as the source MAC address in the traffic originated by the host/VMs. This means, the wireless infrastructure on the network is aware of only the host and all the authentication and authorization policies are applied on the host MAC (as we will not see the VM's MAC address in the 802.11 packets that are being sent on the air/wire to the wireless controller).

However, in certain deployments, it is necessary to be able to enforce policies on each of these individual VMs. In such cases, it is not possible to use the usual Radius change of authorization policies as there is no session present in the Radius server for each of the individual VMs. Since VM MAC addresses (and their IP-MAC bindings) are not learned by the fabric edge/access switch directly connected to the host device (as usually done by Fabric Edge (FE) for host's visible MAC addresses), the FE is not able to register the VM's address to security group association to fabric control plane (CP). This makes it very difficult, or impossible, to apply policies for the individual VMs.

This disclosure describes techniques that enable the enforcement of policies for bridged VMs where the VM information (e.g., MAC address, IP address, etc.) is learned through profiling. Generally, the VM(s) that are running on the host device that are in bridge mode obtain their respective IP address(es) through Dynamic Host Configuration Protocol (DHCP). However, since all the traffic from the host device and VMs behind it use the same source MAC, the infrastructure (e.g., access switch) may support 1:N Mac-to-IP binding. The profiling of the VMs may include the use of endpoint-analytics which may include inspection of the DHCP packets to glean on the VM IP and MAC information.

Once the VM information has been determined, such as the IP and MAC information, this information can be circulated in the control plane and used by the Fabric Edge to enforce security policies for bridged VMs. Thus, analyzing DHCP packets to infer VM context (e.g., MAC and IP) is performed through profiling to identify VMs running in bridged mode on a host device.

Although the systems and methods described herein are discussed with respect to one or more virtual hosts, these systems and methods may be used with any type of device or system. Further, although particular examples are discussed with reference to virtual machines, alternate embodiments may include other types of devices that are bridged or located on a host device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network 100 containing multiple devices, a host, and a wireless adapter. As shown in FIG. 1, network 100 includes a host 102 that is coupled to a wireless adapter 114. In some embodiments, host 102 may also be referred to as a "virtual host" or a "host system." The host device 102 may comprise any type of device configured to communicate over one or more networks, such as network devices including a wireless endpoint, an access point, a router, a switch, a server, a router, a load balancer, etc. The host device 102 may be a personal computing device, such as a workstation, desktop computer, laptop, tablet, network appliance, e-reader, smartphone, or other computing device, and/or any other type of device.

The host 102 may implement (or execute) any number of VMs, such as VM 1 104, VM 2 106, up to VM N 108 (where "N" is any integer of 1 or greater). In the example of FIG. 1, VMs 104, 106, and 108 in bridge mode 110. Generally, when in bridge mode 110, the VMs 104, 106, and 108 re connected to a data communication network 112 using the host device's 10 network adapter 114 (e.g., Ethernet adapter). With bridged networking, the virtual network adapter in each VM 104, 106, and 108 connects to the physical network adapter 114 in the host device 102 or system. The host network adapter 114 enables the VMs 104, 106, and 108 to connect to the data communication network 112 that the host 100 uses. Bridged networking works with both wired and wireless host network adapters 114. Generally, the network adapter may include functionality for providing network connectivity through a Network Interface Controller (NIC), such as a gigabit Ethernet adapter. The network adapter 14 is usable to connect the host device 102 to other computing devices 116, 118, etc., over the data communication network 112. The data communication network 112 may include one or more networks implemented by any viable communication technology, such as wired and/or wireless modalities and/or technologies. The data communication network 112 may include any one of or combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The data communication network 112 may include devices, virtual resources, or other nodes that relay packets from one network segment to another by nodes in the network.

Bridged networking configures each VM 104, 106, and 108 as a unique identity on the network, separate from and unrelated to the host device 102. The VM 104, 106, and 108 are full participant in the network 112 and it has access to other machines on the network, and other machines on the network 112 can contact it as if it were a physical computer on the network 112. Two devices 116 and 118 are shown as being coupled to data communication network 112. Devices 116 and 118 may be any type of computing device or other system capable of communicating with wireless adapter 114 via data communication network 112. Devices 116 and 118 may interact with network 104 via a wired communication link, wireless communication link, or a combination of wired and wireless communication links. Although two devices 116, 118 are shown in FIG. 1, particular implementations of network 100 may include any number of devices connected to one or more data communication networks 112, cellular networks, and other networks (not shown). Data communication network 112 can be any type of network that has any type of network topology and uses any type of communication protocol. Data communication network 112 may also represent a combination of two or more networks.

As described in more detail later in this disclosure, one or more devices (e.g., a system of devices) may enable the enforcement of policies for bridged VMs 104, 106, and 108 where the VM information (e.g., MAC address, IP address, etc.) is learned through profiling. Generally, the VM(s) 104, 106, and 108 that are running on the host device 102 that arm in bridge mode 110 and obtain their respective IP address(es) through DHCP. However, since all the traffic from the host device 102 and VMs 104, 106, and 108 behind it use the same source MAC, the infrastructure of the network 112 (e.g., access switch) may support 1:N Mac-to-IP binding. The profiling of the VMs 104, 106, and 108 may include the use of endpoint-analytics which may include inspection of the DHCP packets to glean on the VM IP and MAC information.

The above-noted example is merely illustrative, and various changes may be made to achieve similar or the same results. For example, host 102 may include any number of VMs that can interact with any number of devices 116, 118 via data communication network 112 and/or other data communication mechanisms.

Figure 2:
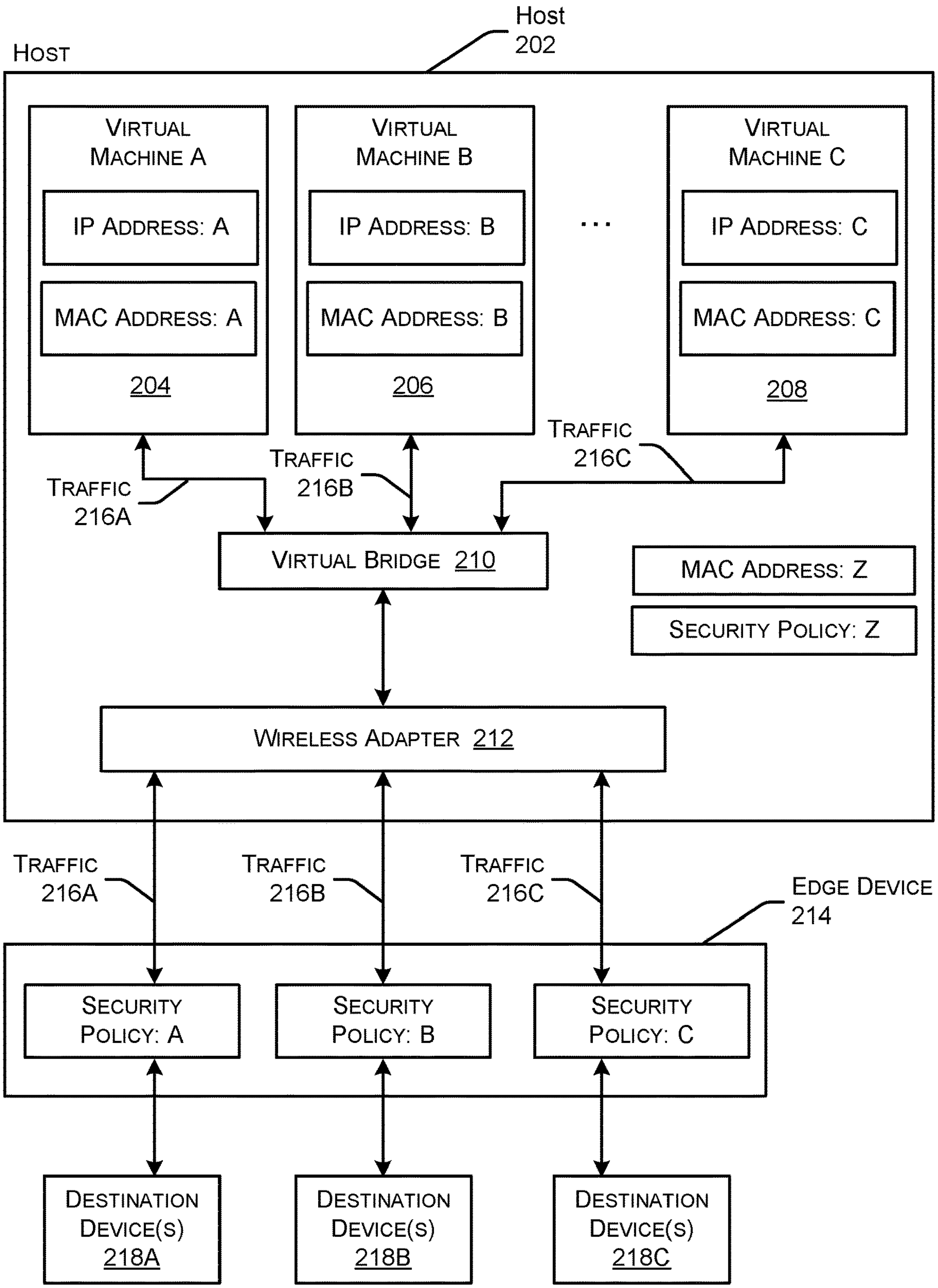
FIG. 2 illustrates a host and multiple virtual machines with various IP addresses, MAC addresses, and security policies.

FIG. 2 illustrates a host 202 and multiple virtual machines with various IP addresses, MAC addresses, and security policies. FIG. 2 is similar to FIG. 1, but includes additional details regarding IP addresses, MAC addresses, and security policies associated with the host and the multiple VMs. As illustrated in FIG. 2, host 202 includes multiple VMs 204, 206, and 208. Host 202 also includes a virtual bridge 210. In some embodiments, host 202 is coupled to a wireless adapter 212.

VM 204 has a specific IP address and a specific MAC address (all labeled "A" for this example). Similarly, VMs 206 and 208 also have specific IP addresses, specific MAC addresses, and specific security policies (labeled "B" and "C," respectively, for this example). As further shown in FIG. 2, host 202 also has a specific IP address, a specific MAC address, and a specific security policy (all labeled "Z" for this example). Thus, the IP address and MAC address for each VM 204, 206, and 208 are unique. Additionally, the IP addresses and MAC addresses for VMs 204, 206, and 208 are different from the IP address and MAC address of host 202. However, traffic communicated from the host device 202 to the network infrastructure (e.g., access point) all has the same MAC address (e.g., MAC address of the wireless adapter 212) despite different VMs communicating the data.

As shown in FIG. 2, when VMs 204, 206, and 208 are operating in bridge mode, their MAC addresses are "hidden" behind host 202. Therefore, other devices coupled to host 202 (e.g., in the same network) cannot identify the VMs being executed by host 202. In some situations, this causes problems for devices and systems that need visibility or control over any client in the network, including VMs operating on a host device. A requirement for VM visibility means that the IP addresses and MAC addresses of VMs 204, 206, and 208 need to be available to other devices and systems in the network. In addition to IP addresses and MAC addresses, some devices and systems need access to the security policy associated with each VM 204, 206, and 208. The systems and methods discussed herein discover, for example, the IP address, MAC address, and security policy associated with VMs, applications, and other processes executing on a host device that would otherwise be "hidden" behind the host's IP address, MAC address, and security policy.

As shown in FIG. 2, one or more edge devices 214 (e.g., router, firewall, switch, etc.) may enforce security policies for the different VMs and/or the host device 102 itself. The traffic 216A, 216B, and 216C communicated to and from VM A, VM B, and VM C may be subjected to respective security policies at an edge device 214 based on the respective IP addresses and/or MAC addresses for the VMs.

Figure 3:
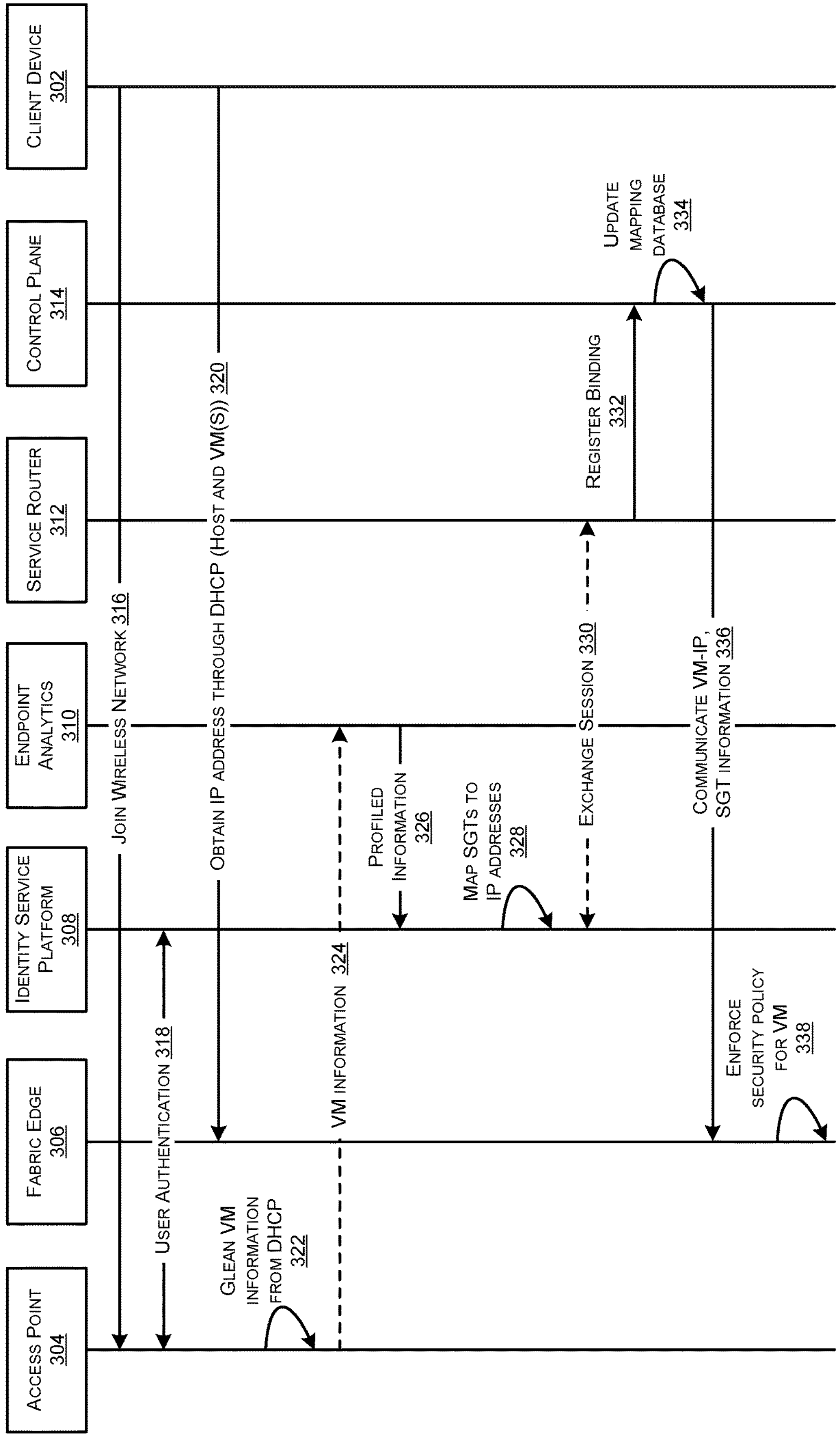
FIG. 3 illustrates an example policy enforcement process for use with bridged virtual machines.

FIG. 3 illustrates an example policy enforcement process 300 for use with bridged virtual machines.

Initially, a client device 302 may perform operations for joining a wireless network at 316. The client device 302 may be any type of device (e.g., host device 102) capable of running one or more VMs in bridge mode, and connecting to a wireless network. For instance, the client device 302 may perform any protocol with, or send any type of request to, an access point 304 associated with a network fabric to join a wireless network.

As shown, the access point 304 may perform user authentication with an identity service platform 308 at 318. In some instances, the identity service platform 308 may be an Identity Services Engine (ISE) that enables a dynamic and automated approach to policy enforcement that simplifies the delivery of highly secure network access control. ISE may enable the use of software-defined access and automates network segmentation for the network fabric. In some instances, the ISE may manage security policies as well as authentication and/or authorization for devices in the network fabric.

At 320, the client device 302 may obtain IP addresses through DHCP for the client device itself 302 as well as the one or more VMs running on the client device 302. For instance, the client device 302 may work with a fabric edge device 306 such as a tunnel router that may use a Locator ID Separation Protocol (LISP) to provide flexible address assignment. The fabric edge 306 may provide IP address for each of the client device 302 and any VMs running thereon in bridge mode.

At 322, the access point 304 may glean VM information from the DHCP packets communicated by the client device 302 and on behalf of the VMs. The information may include information about the VMs, such as the MAC addresses of the VMs, the IP addresses of the VMs, and also information about the client device 302, such as MAC and IP addresses of the client device 102. Additionally, the information may include mapping information that indicates what client device 302 is associated with what bridged VMs.

At 324, an endpoint analytics 310 platform, component, and/or system may perform wireless bridge VM profiling. To accomplish this, it is essential that the access point (e.g., an agent running thereon) has visibility into the VM's DHCP packets. The endpoint analytics platform 310 may profile the VMs by determining IP/MAC addresses for the VMs, the client device 302, and what VMs are running on which client device 302.

After profiling the VMs and client devices 302, the endpoint analytics platform 310 may provide the profiled information at 316 to the identity service platform 308. At 328, the identity service platform 308 may use the profiled information and assign the VMs to specific groups, such as security group tabs (SGTs). The VMs will be assigned to security groups based on various profiling information, such as authorizations for the VMs, users associated with the VMs, access policies for the VMs, types of applications running in the VMs, etc. The identity service platform 308 may assign VMs to security groups by, for example, mapping the security groups (e.g., SGTs) to IP addresses.

At 330, the identity service platform 308 may perform an exchange session with a service router 312, such as a customer premises equipment (CPE) service router 312 and/or an Integrated Services Router (ISR). In some instances, the service router 312 may perform both CPE and ISR functions. The service router 312 may receive the profile information for the VMs, such as by a Security Exchange Protocol session, such as information around the VM-IP addresses, VM-SGT groups, and/or other information.

At 332, the service router 312 may register the bindings (VM-IP, SGT) to the control play 314, such as by registering the bindings to a map-server in the instance of a software-defined access (SDA) network. The map-server may update 334 and maintain the IP-SGT bindings in a mapping database, and the IP-SGT bindings may be registered using a triggering mechanism implemented by an exchange protocol, such as SGT Exchange Protocol (SXP).

At 336, the map-server may communicate the VM-IP and SGT information to the fabric edge 306, such as interested Routing locators (RLOCs) on which the VM/client device 302 are connected. The map-server may notify the ROLCs that have the VM-IP (e.g., the VM-IP get registered by the ROLC during DHCP/SISF/LISP). Additionally, if the client device 302 moves, all the associated VMs' IP addresses will also move of be notified to the new RLOC.

At 338, the fabric edge 306 may fetch the SGACLs from the identity service platform 308 and begin policy enforcement based on the IP addresses and/or MAC addresses for the client devices 302 as well as the bridge VMs running thereon (which may be different, or the same, security policies).

Figure 4B:
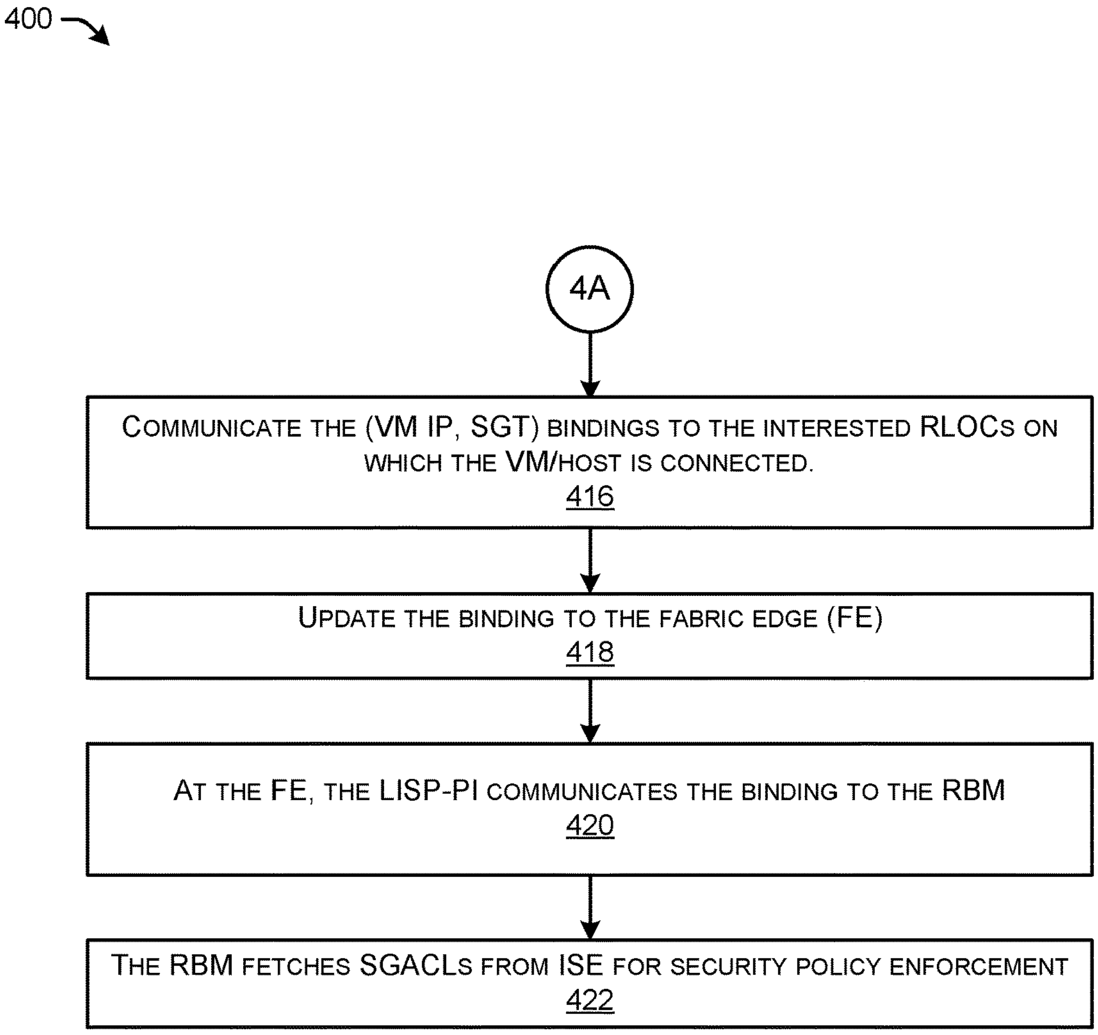
Figure 5:
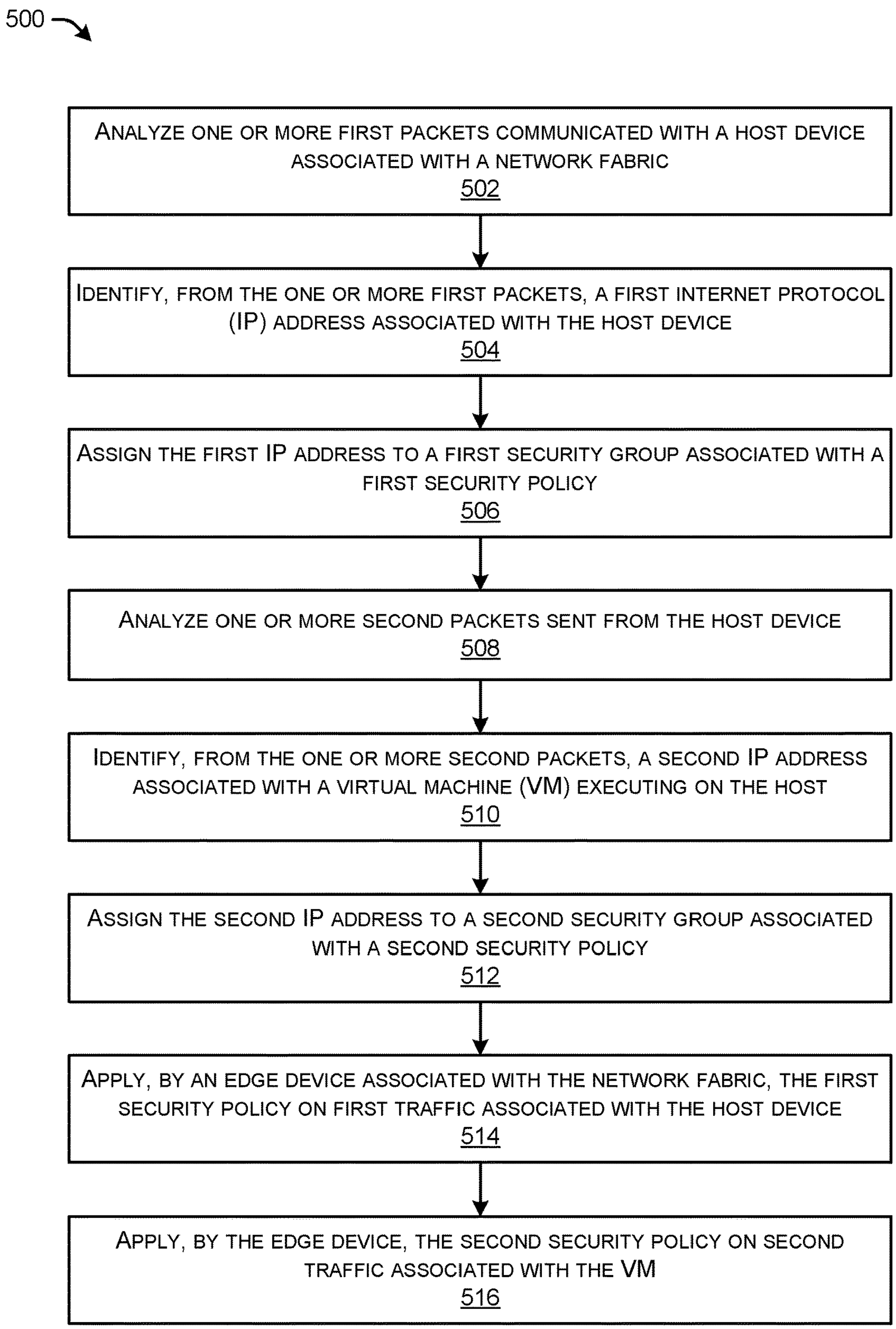
FIG. 5 illustrates a flow diagram of an example method for identifying a VM running in bridge mode and enforcing a security policy for the VM.

FIGS. 4A, 4B and 5 illustrate flow diagrams of example methods 400 and 500 that illustrate various aspects of the techniques of this disclosure. The logical operations described herein with respect to FIGS. 4A, 4B, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A and 4B illustrate a flow diagram of an example method 400 for enforcing policies in the network shown in FIG. 1. The operations described herein with respect to the method 400 may be performed by various components and systems, such as the components illustrated and discussed herein.

The operations of method 400 may enforce various security policies on the individual VMs without creating an explicit session in a radius server. As discussed herein, profiling of the VMs may be performed using endpoint analytics (EA) which may inspect dynamic host configuration protocol (DHCP) packets to identify the VM IP and MAC address information. In some embodiments, the described systems and methods may use LISP-based enterprise fabric. However, the systems and methods described herein can be used with any overlay/fabric network.

At operation 402 of method 400, multiple VMs in a host, and operating in bridge mode, may receive an IP address through DHCP. For instance, the host device 102 may communicate DHCP traffic, using the network interface/adapter 114, according to the DHCP protocol to obtain IP addresses for each of the VMs from a DHCP server.

At operation 404, the process may profile the VMs using endpoint analytics (EA) that includes inspecting the DHCP packets to identify each VM's IP address and MAC address information. In some embodiments, the EA receives data from multiple sources, then collates and analyzes the received data to build a detailed endpoint profile.

At operation 406, the process may perform wireless bridge VM profiling using the information contained in the DHCP packets.

At operation 408, the process may assign each VM to a specific group using, for example, security group tags (SGTs) that are based on the profiling of the VM. In some embodiments, the SGTs are used with access policies to monitor and enforce traffic in, for example, network switches, routers, and firewalls.

At operation 410, the process may communicate the profiled endpoint information from the EA to the identity services engine (ISE). In some embodiments, the ISE supports the creation and enforcement of security policies and access policies for endpoint devices.

At operation 412, the process may assign the SGT to the VM IP while the ISE maintains the VM IP and VM SGT information. For instance, the process may include mapping the IP address of the VM to an SGT, and the ISE may maintain the IP-SGT mapping.

At operation 414, the process may send the (VM IP, SGT) bindings to the Service xTR using security exchange protocol (SXP). SXP is a control protocol that supports the propagation of IP-to-SGT binding information across multiple network devices.

At operation 416, the process may communicate the (VM IP, SGT) bindings to the interested routing locators (RLOCs) on which the VM/host is connected.

At operation 418, the process may update the (VM IP, SGT) bindings to the fabric edge (FE).

At operation 420, at the FE, the LISP-PI may communicate each (VM IP, SGT) binding to a TrustSec® infrastructure.

At operation 422, the TrustSec® infrastucture may fetch the SGACLs from ISE for security policy enforcement.

FIG. 5 illustrates a flow diagram of an example method for identifying a VM running in bridge mode and enforcing a security policy for the VM.

At 502, a device and/or system of devices may analyze one or more first packets communicated with a host device that is associated with a network fabric. For instance, an access point 304 may analyze one or more DHCP packets communicated from a host device 102/302 that are sent to a fabric edge device to obtain an IP address for the host device 102.

At 504, the device and/or system may identify, from the one or more first packets, a first internet protocol (IP) address associated with the host device. For instance, an access point 304 may glean information from the one or more DHCP packets, such as a MAC address and/or IP address associated with the host device 102/302.

At 506, the device and/or system may assign the first IP address to a first security group associated with a first security policy. For instance, an identity service platform 308 may map SGTs to the IP address of the host device 102/302. In some instances, the mapping between the SGTs and IP address of the host device 102/302 may be communicate via a control plane 314 to other devices associated with the network fabric.

At 508, the device and/or system may analyze one or more second packets communicated with the host device. For instance, an access point 304 may analyze one or more second DHCP packets communicated from the host device 102/302 that are sent to a fabric edge device to obtain an IP address for a virtual machine running on the host device 102/302.

At 510, the device and/or system may identify, from the one or more second packets, a second IP address associated with the VM executing on the host device. For instance, the access point 304 may glean information from the one or more second DHCP packets, such as a MAC address and/or IP address associated with the VM executing on the host device 102/302.

At 512, the device and/or system may assign the second IP address to a second security group associated with a second security policy. For instance, the identity service platform 308 may map the IP and/or MAC address of the VM to an SGT, or other security group/policy.

At 514, the device and/or system of devices may apply, such as by an edge device associated with the network fabric, the first security policy on first traffic associated with the host device, and at 516, the device and/or system of devices may apply, such as by the edge device, the second security policy on second traffic associated with the VM. For instance, different security policies associated with different security groups may be applied by the fabric edge 306 to traffic from the VM and host device 102. That is, the traffic from the VM may be treated differently, and subjected to a different security policy, than traffic sent from the host device 102.

In some instances, the method 500 may further include binding a first security group tag (SGT) to the first IP address associated with the host device, and binding a second SGT to the second IP address associated with the VM. In such examples, once bound, the method 500 may include propagating the binding of the first SGT and the first IP address via a control plane associated with the network fabric, and propagating the binding of the second SGT and the second IP address via the control plane. Propagating the binding of the second SGT to the second IP address associated with the VM may include registering the binding to a map-server associated with the network fabric. in some examples, the registration may be done from the profiler that identifies the host/VM IP or a node associated with the profiler which could be different than the access node where the host/VM is actually connected.

Figure 6:
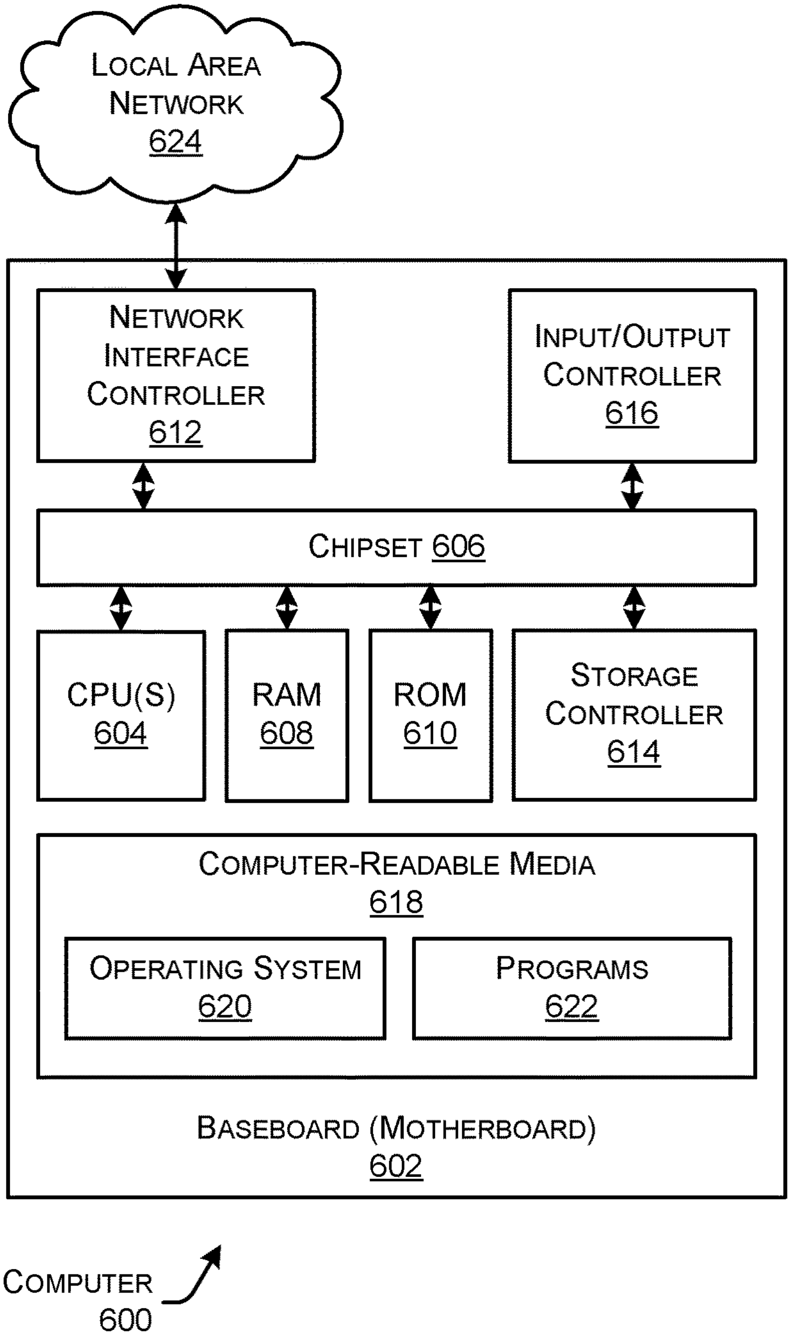
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to any of the servers, routers, or devices discussed herein. In some embodiments, computer 600 may include networked devices such as servers, switches, routers, hubs, bridges, gateways, modems, repeaters, access points, etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a Network Interface Controller (NIC) 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices described herein, and or any components included therein, may be supported by one or more devices similar to computer 600. Stated otherwise, some or all of the operations performed by the host device 102, and or any components included therein, may be performed by one or more computer devices 600 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a router, a border router, and/or a server. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing instructions that, when executed by the one or more processors, cause the one or more processors to perform operations comprising:
receiving first data indicative of a first profile associated with a host device associated with a network fabric, the first profile including a first Media Access Control (MAC) address and a first Internet Protocol (IP) address associated with the host device;
receiving second data indicative of a second profile associated with a computing resource that is running behind the host device in bridge mode, the second profile including a second MAC address and a second IP address associated with the computing resource;
assigning, based at least in part on the first profile, the first IP address to a first security group associated with a first policy;
assigning, based at least in part on the second profile, the second IP address to a second security group associated with a second policy;
applying, by a network device associated with the network fabric, the first policy on first traffic associated with the host device; and
applying, by the network device, the second policy on second traffic associated with the computing resource, the second policy being different than the first policy,
wherein the first traffic and the second traffic have a same MAC address associated with a network interface of the host device based on the computing resource running behind the host device in bridge mode.

2. The system of claim 1, the operations further comprising:
analyzing one or more Dynamic Host Configuration Protocol (DHCP) packets communicated between the host device and a DHCP server; and
identifying, from the one or more DHCP packets, the second IP address associated with the second security group and the second MAC address associated with the computing resource.

3. The system of claim 2, wherein:
the one or more DHCP packets are communicated between the host device and a fabric edge device associated with the network fabric, wherein the fabric edge device communicates with a DHCP server to obtain the second IP address for the computing resource; and
the analyzing the one or more second DHCP packets is performed at a fabric access point associated with the network fabric.

4. The system of claim 3, the operations further comprising:
profiling the computing resource by using information obtained from the one or more DHCP packets to generate profile data; and
mapping, at an identity services platform and using the profile data, the second IP address of the computing resource to the second security group associated with the second policy.

5. The system of claim 1, wherein the computing resource is connected to the network fabric via the host device and in a bridge mode.

6. The system of claim 1, the operations further comprising:
binding a first security group tag (SGT) to the first IP address associated with the host device;
propagating a first binding between the first SGT and the first IP address via a control plane associated with the network fabric;
binding a second SGT to the second IP address associated with the computing resource; and
propagating a second binding between the second SGT and the second IP address via the control plane.

7. The system of claim 6, wherein propagating the binding of the second SGT to the second IP address associated with the computing resource includes registering the binding to a map-server associated with the network fabric.

8. A computer-implemented method comprising:
receiving first data indicative of a first profile associated with a host device associated with a network fabric, the first profile including a first Media Access Control (MAC) address and a first Internet Protocol (IP) address associated with the host device;
receiving second data indicative of a second profile associated with a computing resource that is running behind the host device in bridge mode, the second profile including a second MAC address and a second IP address associated with the computing resource;
assigning, based at least in part on the first profile, the first IP address to a first security group associated with a first policy;
assigning, based at least in part on the second profile, the second IP address to a second security group associated with a second policy;
applying, by a network device associated with the network fabric, the first policy on first traffic associated with the host device; and
applying, by the network device, the second policy on second traffic associated with the computing resource, the second policy being different than the first policy,
wherein the first traffic and the second traffic have a same MAC address associated with a network interface of the host device based on the computing resource running behind the host device in bridge mode.

9. The method of claim 8, further comprising:
analyzing one or more Dynamic Host Configuration Protocol (DHCP) packets communicated between the host device and a DHCP server; and
identifying, from the one or more DHCP packets, the second IP address associated with the second security group and the second MAC address associated with the computing resource.

10. The method of claim 9, wherein:
the one or more DHCP packets are communicated between the host device and a fabric edge device associated with the network fabric, wherein the fabric edge device communicates with a DHCP server to obtain the second IP address for the computing resource; and
the analyzing the one or more second DHCP packets is performed at a fabric access point associated with the network fabric.

11. The method of claim 10, further comprising:

profiling the computing resource by using information obtained from the one or more DHCP packets to generate profile data; and mapping, at an identity services platform and using the profile data, the second IP address of the computing resource to the second security group associated with the second policy.

12. The method of claim 8, wherein the computing resource is connected to the network fabric via the host device and in a bridge mode.

13. The method of claim 8, further comprising:

binding a first security group tag (SGT) to the first IP address associated with the host device;

propagating a first binding between the first SGT and the first IP address via a control plane associated with the network fabric;

binding a second SGT to the second IP address associated with the computing resource; and propagating a second binding between the second SGT and the second IP address via the control plane.

14. The method of claim 13, wherein propagating the binding of the second SGT to the second IP address associated with the computing resource includes registering the binding to a map-server associated with the network fabric.

15. A system comprising:

one or more processors; and one or more non-transitory computer-readable media storing instructions that, when executed by the one or more processors, cause the one or more processors to perform operations comprising:

receiving first data indicating a first Internet Protocol (IP) address and a Media Access Control (MAC) address associated with a computing resource that is running in bridge mode behind a host device in a network fabric;

receiving second data indicating a second IP address and the MAC address associated with the computing resource that is running in bridge mode behind the host device;

assigning the first IP address to a first security group associated with a first policy;

assigning the second IP address to a second security group associated with a second policy;

applying, by a network device associated with the network fabric, the first policy on first traffic associated with the host device; and applying, by the network device, the second policy on second traffic associated with the computing resource, the second policy being different than the first policy, wherein the first traffic and the second traffic have a same MAC address associated with a network interface of the host device based on the computing resource running behind the host device in bridge mode.

16. The system of claim 15, further comprising:

analyzing one or more Dynamic Host Configuration Protocol (DHCP) packets communicated between the host device and a DHCP server; and identifying, from the one or more DHCP packets, the second IP address associated with the second security group and the MAC address associated with the computing resource.

17. The system of claim 16, further comprising:

the one or more DHCP packets are communicated between the host device and a fabric edge device associated with the network fabric, wherein the fabric edge device communicates with a DHCP server to obtain the second IP address for the computing resource; and the analyzing the one or more second DHCP packets is performed at a fabric access point associated with the network fabric.

18. The system of claim 17, further comprising:

profiling the computing resource by using information obtained from the one or more DHCP packets to generate profile data; and mapping, at an identity services platform and using the profile data, the second IP address of the computing resource to the second security group associated with the second policy.

19. The system of claim 15, binding a first security group tag (SGT) to the first IP address associated with the host device;

propagating a first binding between the first SGT and the first IP address via a control plane associated with the network fabric;

binding a second SGT to the second IP address associated with the computing resource; and propagating a second binding between the second SGT and the second IP address via the control plane.

20. The system of claim 19, wherein propagating the binding of the second SGT to the second IP address associated with the computing resource includes registering the binding to a map-server associated with the network fabric.

* * * * *